(12) United States Patent
Chang et al.

(10) Patent No.: US 12,219,203 B2
(45) Date of Patent: *Feb. 4, 2025

(54) METHOD, SYSTEM, AND COMPUTER READABLE RECORDING MEDIUM FOR IMPLEMENTING SEAMLESS SWITCHING MODE BETWEEN CHANNELS IN MULTI-STREAM LIVE TRANSMISSION ENVIRONMENT

(71) Applicant: NAVER CORPORATION, Seongnam-si (KR)

(72) Inventors: Joon-kee Chang, Seongnam-si (KR); SungHo Kim, Seongnam-si (KR); Hyesung No, Seongnam-si (KR); Yun Ho Jung, Seongnam-si (KR); Jinhoon Kim, Seongnam-si (KR); Yeong Jin Jeong, Seongnam-si (KR); Jeongki Kim, Seongnam-si (KR); In Cheol Kang, Seongnam-si (KR); Jonghyeok Lee, Seongnam-si (KR); JaeChul Ahn, Seongnam-si (KR); SungTaek Cho, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 177 days.

This patent is subject to a terminal disclaimer.

(21) Appl. No.: 17/645,374

(22) Filed: Dec. 21, 2021

(65) Prior Publication Data
US 2022/0116677 A1    Apr. 14, 2022

Related U.S. Application Data

(63) Continuation of application No. PCT/KR2021/011317, filed on Aug. 24, 2021.

(30) Foreign Application Priority Data

Sep. 4, 2020 (KR) .................... 10-2020-0112885

(51) Int. Cl.
*H04N 21/431* (2011.01)
*H04N 21/2187* (2011.01)
(Continued)

(52) U.S. Cl.
CPC ..... *H04N 21/4316* (2013.01); *H04N 21/2187* (2013.01); *H04N 21/4821* (2013.01); *H04N 21/4858* (2013.01)

(58) Field of Classification Search
CPC ......... H04N 21/4821; H04N 21/21805; H04N 21/4347; H04N 21/4858; H04N 21/4316; H04N 21/2187
See application file for complete search history.

(56) References Cited

U.S. PATENT DOCUMENTS 7,644,425 B2 * 1/2010 Parker ............. H04N 21/23418
725/43
10,945,024 B2 * 3/2021 Levy ................ H04N 21/64322
(Continued)

FOREIGN PATENT DOCUMENTS

JP      08279995 A     10/1996
JP    2004177614 A      6/2004
(Continued)

OTHER PUBLICATIONS

Search Report issued in corresponding EP Patent Application No. 21820447.7, dated May 8, 2023.
(Continued)

*Primary Examiner* — Ngoc K Vu
(74) *Attorney, Agent, or Firm* — GREER BURNS & CRAIN, LTD.

(57) ABSTRACT

A method for implementing a seamless switching mode between channels in a multi-stream live transmission envi-
(Continued)

ronment includes receiving in a single stream, a composite image in which images of multiple channels are synthesized into a single image, composing a view mode having a layout including the images of the multiple channels using the composite image, and changing a layout of the view mode using the composite image.

15 Claims, 15 Drawing Sheets

(51) Int. Cl.
*H04N 21/482* (2011.01)
*H04N 21/485* (2011.01)

(56) References Cited

U.S. PATENT DOCUMENTS

| | | | | |
|---|---|---|---|---|
| 2002/0049979 | A1* | 4/2002 | White | H04N 23/661 |
| | | | | 348/E7.071 |
| 2007/0039032 | A1* | 2/2007 | Goldey | H04N 21/8106 |
| | | | | 725/35 |
| 2007/0277214 | A1* | 11/2007 | Kim | H04N 7/163 |
| | | | | 348/E5.006 |
| 2010/0138862 | A1* | 6/2010 | Qin | H04N 21/4316 |
| | | | | 725/39 |
| 2011/0113447 | A1* | 5/2011 | Jung | H04N 21/4755 |
| | | | | 725/41 |
| 2011/0119711 | A1 | 5/2011 | Marshall et al. | |
| 2013/0027502 | A1 | 1/2013 | Skramstad | |
| 2014/0118467 | A1 | 5/2014 | Kim et al. | |
| 2014/0380380 | A1 | 12/2014 | Heller et al. | |
| 2016/0198214 | A1 | 7/2016 | Levy et al. | |
| 2017/0134762 | A1 | 5/2017 | Goldberg et al. | |
| 2020/0351525 | A1 | 11/2020 | Sugimoto | |
| 2023/0217047 | A1 | 7/2023 | Chang et al. | |

FOREIGN PATENT DOCUMENTS

| | | |
|---|---|---|
| JP | 2005522922 A | 7/2005 |
| JP | 2007329847 A | 12/2007 |
| KR | 1020060120571 A | 11/2006 |
| KR | 1020070025335 A | 3/2007 |
| KR | 100827198 B1 | 4/2008 |
| KR | 1008271980000 A | 4/2008 |
| KR | 1020140055252 A | 5/2014 |
| KR | 1020150008739 A | 1/2015 |
| KR | 1020160078027 A | 7/2016 |
| KR | 1020170084554 A | 7/2017 |
| KR | 1020180005234 A | 1/2018 |
| WO | 03087961 A1 | 10/2003 |

OTHER PUBLICATIONS

ISR issued in corresponding patent application No. PCT/KR2021/011317, dated Dec. 16, 2021.

Office Action issued in corresponding Japanese patent application No. 2021-571022, dated Jan. 24, 2023.

Japanese Office Action issued in Japanese patent application No. 2023-513587, dated Mar. 5, 2024.

* cited by examiner

METHOD, SYSTEM, AND COMPUTER READABLE RECORDING MEDIUM FOR IMPLEMENTING SEAMLESS SWITCHING MODE BETWEEN CHANNELS IN MULTI-STREAM LIVE TRANSMISSION ENVIRONMENT

CROSS-REFERENCE TO RELATED APPLICATIONS

This is a continuation application of International Application No. PCT/KR2021/011317, filed Aug. 24, 2021, which claims the benefit of Korean Patent Application No. 10-2020-0112885, filed Sep. 4, 2020.

BACKGROUND OF THE INVENTION

Field of Invention

The following description relates to technology for switching between channels in a multi-stream live transmission environment.

Description of Related Art

A rapid increase in the number of users of high-speed communication networks enables the development of new services and diversification of service items through communication networks. A video service may be the most common service among services using such communication networks.

For example, technology for providing a video link service capable of viewing a linked video on the Internet while moving using a mobile communication terminal is disclosed in Korean Patent Registration No. 10-0827198 (registered on Apr. 25, 2008) titled an "apparatus and method for providing a video link service."

A client-server-based video service system is in a structure of transmitting a real-time video streaming from an encoder server to a client and employs a scheme of encoding an image input from a camera and the like and transmitting the encoded image to the client with audio data in a live transmission environment.

When video streaming data for live transmission comes in multiple channels, there are many difficulties and limitations in providing a live video service to a plurality of clients using a scheme of encoding and transmitting a plurality of videos coming through the multiple channels in real time.

BRIEF SUMMARY OF THE INVENTION

One or more example embodiments provide a method and a system that may compose a multi-view mode including videos of multiple channels using a minimum number of networks in a multi-stream live transmission environment providing live videos of the multiple channels.

One or more example embodiments provide a method and system that may implement a seamless switching mode while maintaining synchronization between an audio and a video when switching between channels in a multi-stream live transmission environment.

According to at least one example embodiment, there is provided a live video playback method implemented by a computer apparatus. The computer apparatus includes at least one processor configured to execute computer-readable instructions included in a memory, and the live video playback method includes receiving, by the at least one processor, a composite image in which images of multiple channels are synthesized into a single image in a live transmission environment; composing, by the at least one processor, a view mode including the images of the multiple channels using the composite image; and changing, by the at least one processor, a layout between the view modes using the composite image.

According to an aspect, the composing of the view mode may include obtaining a sprite for each channel by separating a composition image for each channel from the composite image; and composing a multi-view mode by rendering the sprite for each channel according to the layout.

According to another aspect, in the composite image, an image of one channel may be provided as a main image with a higher resolution than those of remaining other channels and the images of the other channels may be provided as sub-images.

According to still another aspect, the composing of the view mode may include, for a first composite image in which an image of a first channel has a higher resolution than those of remaining other channels, rendering a sprite for each channel separated from the first composite image according to a layout of a multi-view mode in which the image of the first channel is displayed as a main image, and the changing of the layout may include, when an image of a specific channel is selected from the multi-view mode, rendering the sprite for each channel separated from the first composite image according to the layout of a multi-view mode in which the image of the specific channel is displayed as the main image and then receiving a second composite image in which the image of the specific channel has a higher resolution than those of remaining other channels and rendering a sprite for each channel separated from the second composite image according to the layout of the multi-view mode in which the image of the specific channel is displayed as the main image.

According to still another aspect, the composing of the view mode may include, for a first composite image in which an image of a first channel has a higher resolution than those of remaining other channels, rendering a sprite for each channel separated from the first composite image according to a layout of a multi-view mode in which the image of the first channel is displayed as a main image, and the changing of the layout may include, when an image of a specific channel is selected from the multi-view mode, rendering the sprite for each channel separated from the first composite image as a full screen and then receiving a second composite image in which the image of the specific channel has a higher resolution than those of images of remaining other channels and rendering a sprite of the specific channel among sprites for the respective channels separated from the second composite image as the full screen.

According to still another aspect, the changing of the layout may include, in response to a user request for a full-view mode in which the sprite of the specific channel is rendered as the full screen, rendering the sprite for each channel separated from the second composite image according to a layout of a multi-view mode in which the image of the first channel is displayed as the main channel and then receiving again the first composite image and rendering the sprite for each channel separated from the first composite image as the layout of the multi-view mode in which the image of the first channel is displayed as the main image.

According to still another aspect, a sprite of a remaining other channel may not be rendered and may be included in a hidden state in a full-view mode in which the sprite of the specific channel is rendered as the full screen.

According to still another aspect, the changing of the layout may include flushing an image stream corresponding to previous data in a player buffer for image switching between the view modes.

According to still another aspect, the changing of the layout may include determining an image switching point in time between the view modes using timed-metadata included in a container of an image stream.

According to still another aspect, the changing of the layout may include providing an interface for requesting a change in a display position between images of the respective channels in the view mode or switching from an image of a specific channel to a full-view mode.

According to at least one example embodiment, there is provided a computer-readable record medium storing a program to computer-implement the live video playback method.

According to at least one example embodiment, there is provided a computer apparatus including at least one processor configured to execute computer-readable instructions included in a memory. The at least one processor is configured to receive, as a single stream, a composite image in which images of multiple channels are synthesized into a single image in a live transmission environment, compose a view mode including the images of the multiple channels using the composite image, and change a layout between the view modes using the composite image.

According to example embodiments, it is possible to play back live videos of multiple channels using a minimum number of networks by composing a multi-view mode by receiving a single stream in which live videos of multiple channels are synthesized into a single video in a multi-stream live transmission environment.

According to example embodiments, it is possible to improve quality of service (QoS) and quality of experience (QoE) by implementing a seamless switching mode while maintaining synchronization between an audio and a video when switching between channels in a multi-stream live transmission environment.

DETAILED DESCRIPTION OF THE INVENTION

Hereinafter, example embodiments are described with reference to the accompanying drawings.

A live video playback system according to the example embodiments may be implemented by at least one computer apparatus. A live video playback method according to the example embodiments may be performed through the at least one computer apparatus included in the live video playback system. Here, a computer program according to an example embodiment may be installed and run on the computer apparatus and the computer apparatus may perform the live video playback method according to the example embodiments under the control of the running computer program. The aforementioned computer program may be stored in a computer-readable recording medium to computer-implement the live video playback method in conjunction with the computer apparatus.

Figure 1:
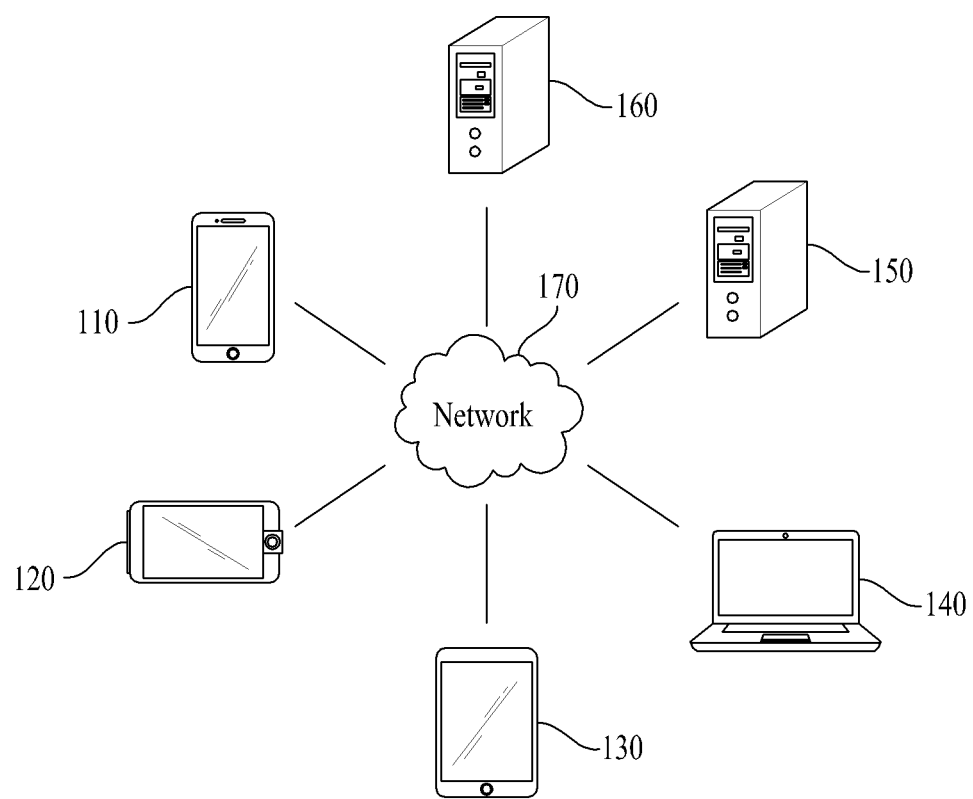
FIG. 1 illustrates an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the environment applicable to the example embodiments is not limited to the network environment of FIG. 1.

Each of the plurality of electronic devices 110, 120, 130, and 140 may be a fixed terminal or a mobile terminal that is implemented as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a live video service, a content providing service, a group call service (or an audio conference service), a messaging service, a mail service, a social network service, a map service, a translation service, a financial service, a payment service, a search service, etc.) to the plurality of electronic devices 110, 120, 130, and 140 connected over the network 170.

Figure 2:
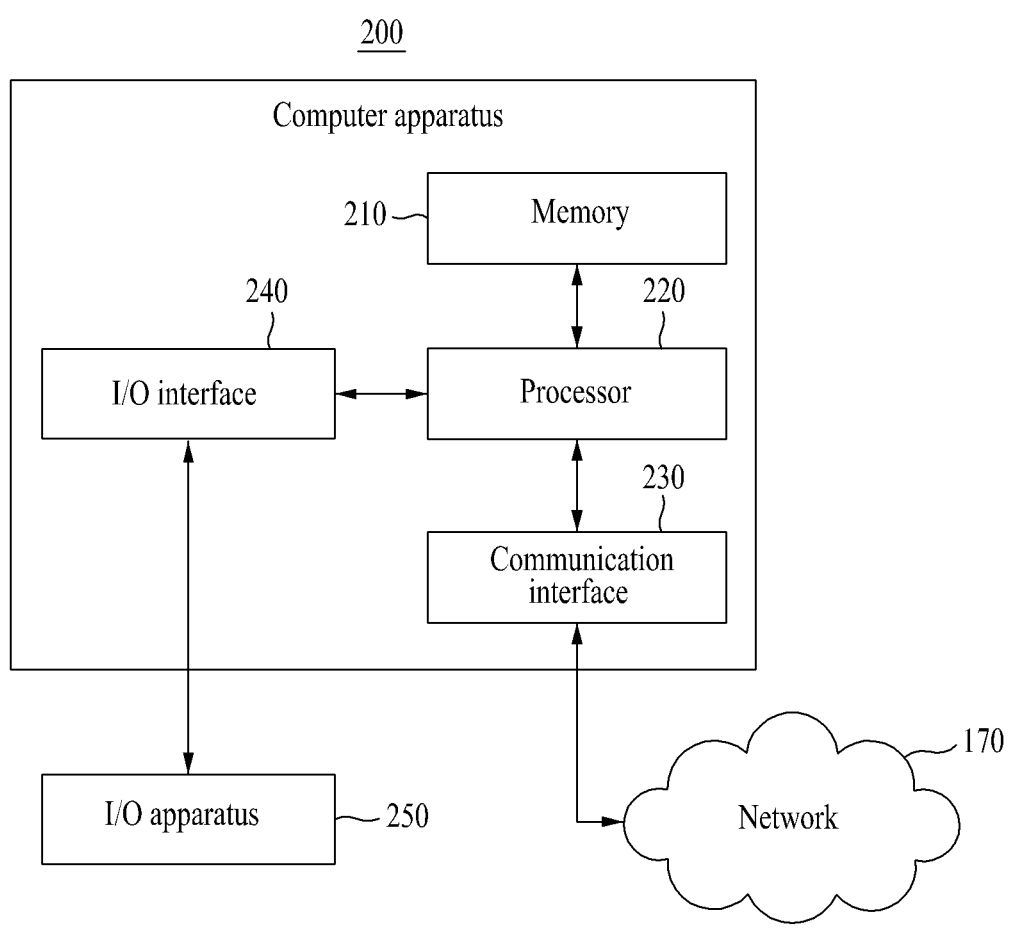
FIG. 2 is a block diagram illustrating an example of a computer apparatus according to an example embodiment.

FIG. 2 is a block diagram illustrating an example of a computer apparatus according to an example embodiment. Each of the plurality of electronic devices 110, 120, 130, and 140 or each of the servers 150 and 160 may be implemented in a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable record medium. The permanent mass storage device, such as ROM and disk drive, may be included in the computer apparatus 200 as a permanent storage device separate from the memory 210. Also, an operating system (OS) and at least one program code may be stored in the memory 210. Such software components may be loaded to the memory 210 from another computer-readable recording medium separate from the memory 210. The other computer-readable recording medium may include a computer-readable recording medium, for example, a floppy drive, a disk, a tape, a DVD/CD-ROM drive, a memory card, etc. According to other example embodiments, software components may be loaded to the memory 210 through the communication interface 230, instead of the computer-readable recording medium. For example, the software components may be loaded to the memory 210 based on a computer program installed by files provided over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in a storage device, such as the memory 210.

The communication interface 230 may provide a function for communication between the computer apparatus 200 and other apparatuses (e.g., the aforementioned storage devices) over the network 170. For example, the processor 220 of the computer apparatus 200 may transfer a request or an instruction created based on a program code stored in the storage device such as the memory 210, data, a file, etc., to the other apparatuses over the network 170 under the control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium (e.g., the aforementioned permanent storage device) further includable in the computer apparatus 200.

The I/O interface 240 may be a device used for interfacing with an I/O apparatus 250. For example, an input device of the I/O apparatus 250 may include a device, such as a microphone, a keyboard, a mouse, etc., and an output device of the I/O apparatus 250 may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

Also, according to other example embodiments, the number of components included in computer apparatus 200 may be less than or greater than the components of FIG. 2. For example, the computer apparatus 200 may be configured to include at least a portion of the I/O apparatus 250 or may further include other components, for example, a transceiver and a database.

Figure 3:
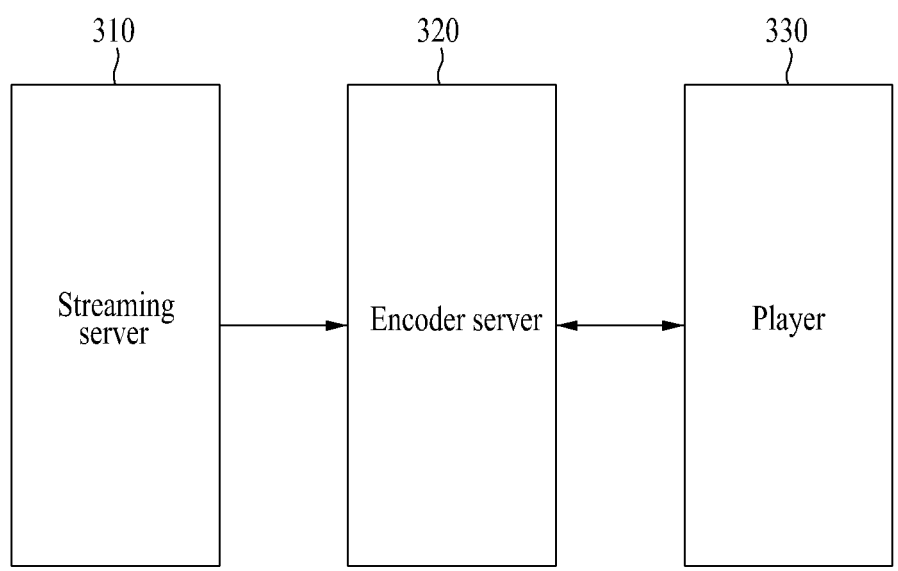
FIG. 3 illustrates an example of a process of providing a live video service according to an example embodiment.

FIG. 3 illustrates an example of a process of providing a live video service according to an example embodiment. FIG. 3 illustrates each of a streaming server 310, an encoder server 320, and a player 330. Here, the streaming server 310 and the encoder server 320 may be software modules installed and running together on the server 150 or the server 160, or separately on the server 150 and the server 160 to provide a live video service. Also, the player 330 may be software modules installed and running on any of the terminal devices 110, 120, 130, 140 of a user to play back a video.

Figure 4:
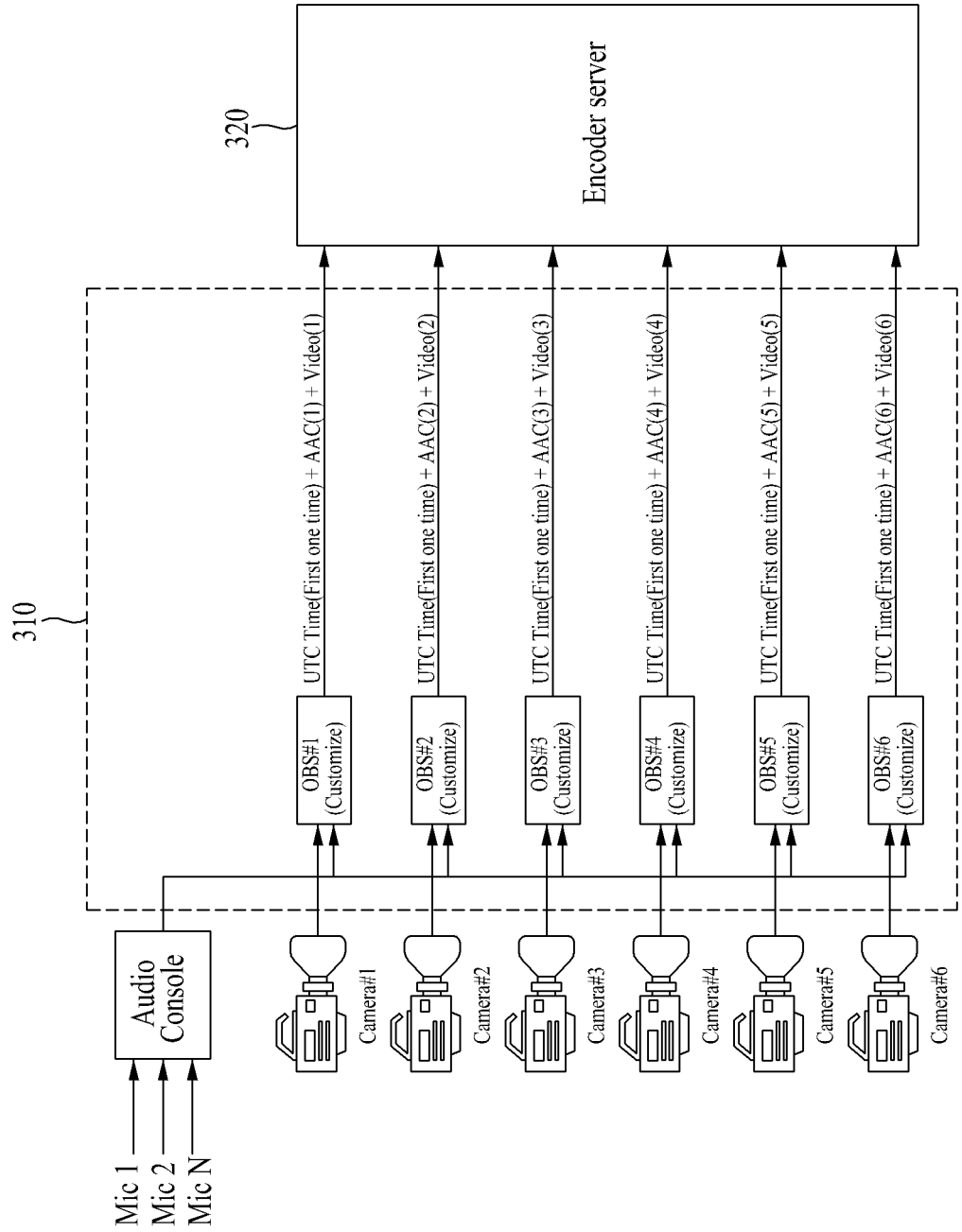
FIG. 4 illustrates an example of a multi-stream live transmission environment according to an example embodiment.

Referring to FIG. 4, the streaming server 310 refers to a server device that performs a transmission functionality and may include, for example, an open broadcaster software (OBS) module for recording and real-time streaming. The streaming server 310 may receive each of videos simultaneously captured through a plurality of cameras through each corresponding channel and may perform real-time streaming to the encoder server 320 as a multi-channel image. As used herein, the term "image" refers to moving visual images and is used interchangeably with "video."

Regardless of a camera, an audio channel may use the same input. The encoder server 320 may use an audio of a channel corresponding to a basic channel among a plurality of channels as a basic stream.

The streaming server 310 may transmit a multi-channel image using an OBS module for synchronization processing between video channels. Therefore, the encoder server 320 may process synchronization between the video channels by calculating an absolute time of each video frame using a coordinated universal time (UTC) and a predetermined time standard (PTS).

In particular, the encoder server 320 may provide at least one composite image in which videos of multiple channels are synchronized into a single video, such that the player 330 may compose a multi-view mode using a minimum number of networks in a multi-stream live transmission environment.

Figure 5:
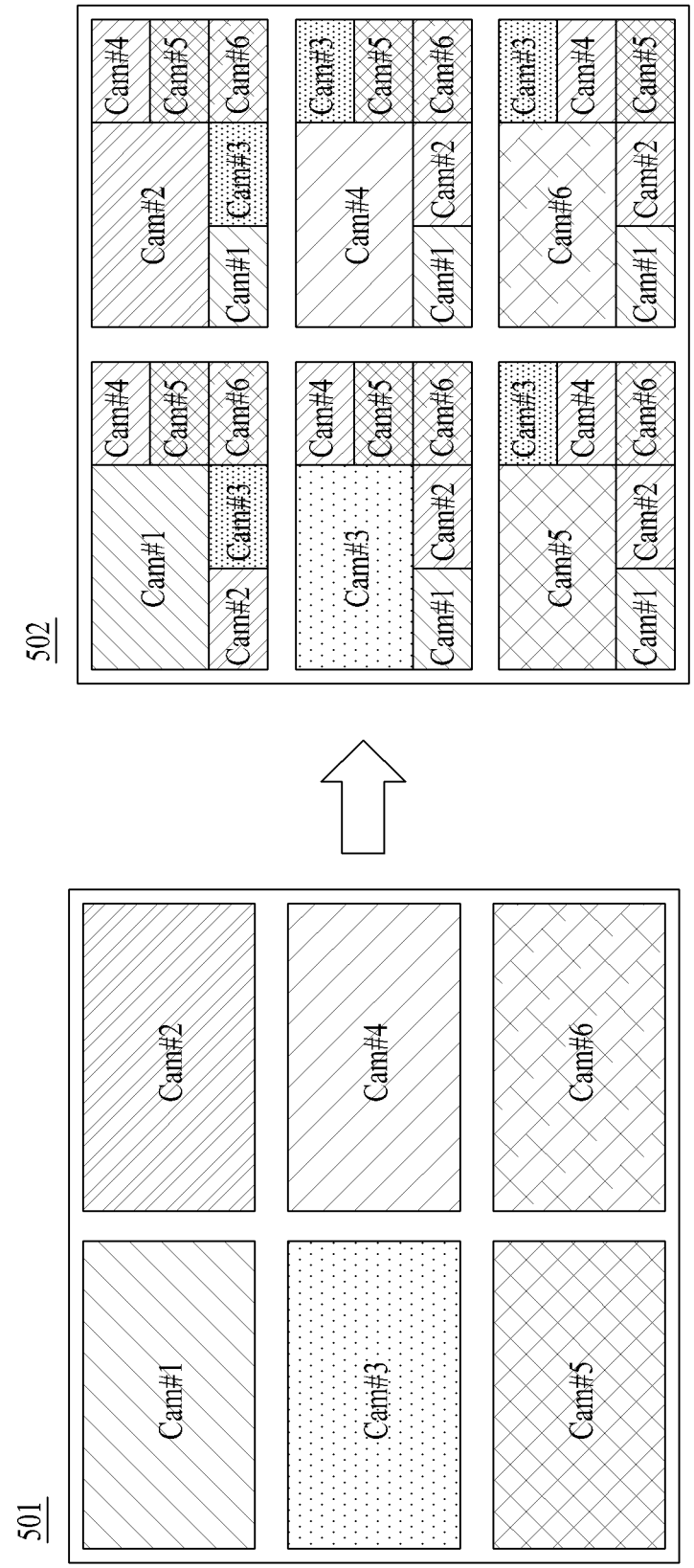
FIG. 5 illustrates an example of a process of encoding videos of multiple channels according to an example embodiment.

For example, referring to FIG. 5, the encoder server 320 may create a plurality of composite images 502 using original images (Cam #1 to Cam #6) 501 captured through six cameras. The composite image 502 refers to an image in which the original images 501 are combined into a single image. The encoder server 320 may create the composite image 502 by combining the original images 501 according to a predetermined layout.

For example, the encoder server 320 may create a number of composite images 502 corresponding to a number of video channels, and may compose a video of a single channel as a main image and videos of remaining other channels as sub-images. That is, the encoder server 320 may compose the video (main image) of the single channel with a higher resolution than those of videos (sub-images) of remaining other channels. Here, the encoder server 320 may compose the videos (sub-images) of the remaining other channels, excluding the video (main image) of the single channel, with the same resolution or may compose the same with a higher resolution according to the priority of each channel.

The scheme of creating the composite image 502, the number of composite images 502, the layout structure, and the like are provided as an example only and may be readily modified.

The encoder server 320 may transmit videos of multiple channels as a single stream using the composite image 502 instead of transmitting each of the plurality of videos coming into the multiple channels as a single stream in the multi-stream live transmission environment.

In the following example embodiment, a composite image in which a video of channel 1 corresponding to a camera (Cam #1) among the composite images 502 is a main image is referred to as a 'Channel #1 composite image' and is also referred to as a 'Channel #2 composite image,' a 'Channel #3 composite image,' and the like according to each channel of a video composed as a main image.

Unique information capable of identifying a corresponding image may be included in a stream of each composite image 502. When a playback image is changed with the Channel #2 composite image during playback of the Channel #1 composite image through unique image information of each stream, the player 330 may recognize that the changed image is the Channel #2 composite image.

Figure 6:
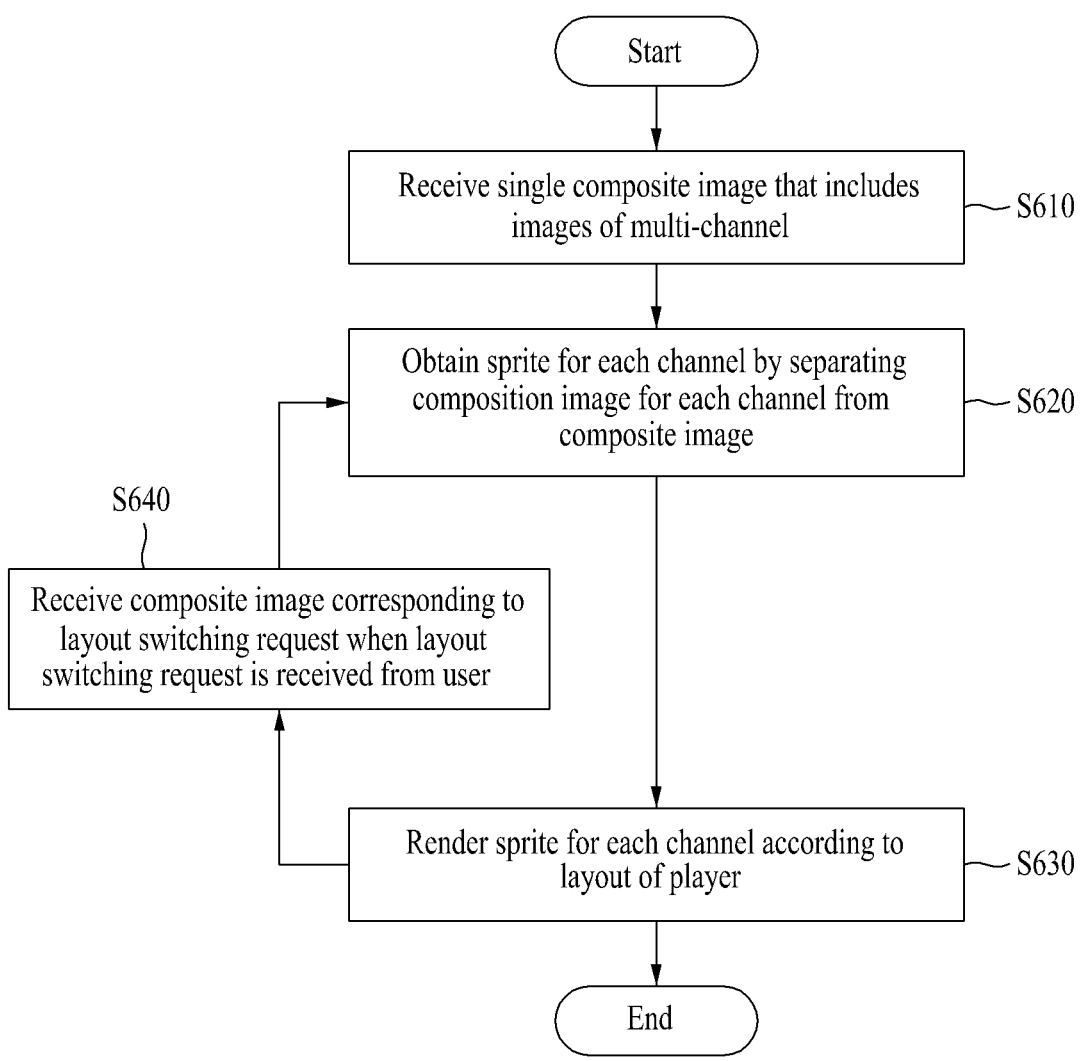
FIG. 6 is a flowchart illustrating an example of a live video playback method according to an example embodiment.

FIG. 6 is a flowchart illustrating an example of a live video playback method according to an example embodiment. The live video playback method according to the example embodiment may be performed by the computer apparatus 200 that implements the aforementioned player 330. If the player 330 is implemented on a terminal device of a user, the computer apparatus 200 may correspond to the terminal devices 110, 120, 130, 140. In this case, the processor 220 of the computer apparatus 200 may be configured to execute a control instruction according to a code of at least one program or a code of an OS included in the memory 210. Here, the processor 220 may control the computer apparatus 200 to perform operations S610 to S640 included in the method of FIG. 6 according to a control instruction provided from a code stored in the computer apparatus 200.

In operation S610, the computer apparatus 200 may receive, from the encoder server 320 implemented in the server 150 or 160, a single composite image that includes a plurality of images from multiple channels in a multi-stream live transmission environment. The computer apparatus 200 may download a single stream from the encoder server 320 and may receive an image stream in which live images of multiple channels are synthesized in a single image. The computer apparatus 200 may selectively receive a composite image corresponding to layout information determined in the player 330 by referring to layout information of a composite image for each channel (Channel #1 composite image, Channel #2 composite image, etc.). For example, when the player 330 requests a layout in which a video of channel 1 is provided as a main image, the computer apparatus 200 may receive the Channel #1 composite image from the encoder server 320.

In operation S620, the computer apparatus 200 may obtain a sprite for each channel by separating a composition image for each channel from the composite image received as a single stream. That is, the computer apparatus 200 may obtain a sprite for each channel by separating the composite image through post processing. The computer apparatus 200 may separate the composite image using various graphics engines, for example, an open graphics library (open GL).

In operation S630, the computer apparatus 200 may render the sprite for each channel according to a layout of the player 330. That is, the computer apparatus 200 may play back live images of multiple channels received as a single stream by rendering a sprite for each camera separated from the composite image to fit a desired layout.

In operation S640, when a layout switching request is received through the player 330 from the user, the computer apparatus 200 may receive a composite image corresponding to the layout switching request among composite images providable from the encoder server 320. When there is a need to change a layout according to a user input, such as changing a main image or changing to a full screen mode (hereinafter, a full-view mode) for a live image currently being played back on the player 330, the computer apparatus 200 may change the composite image received from the encoder server 320 to a composite image of the desired layout.

The computer apparatus 200 may switch between channels, that is, may switch a layout of a live image being played back on the player 330 by repeating the aforementioned process (S620 and S630) in response to a change of the composite image received from the encoder server 320.

Figure 7:
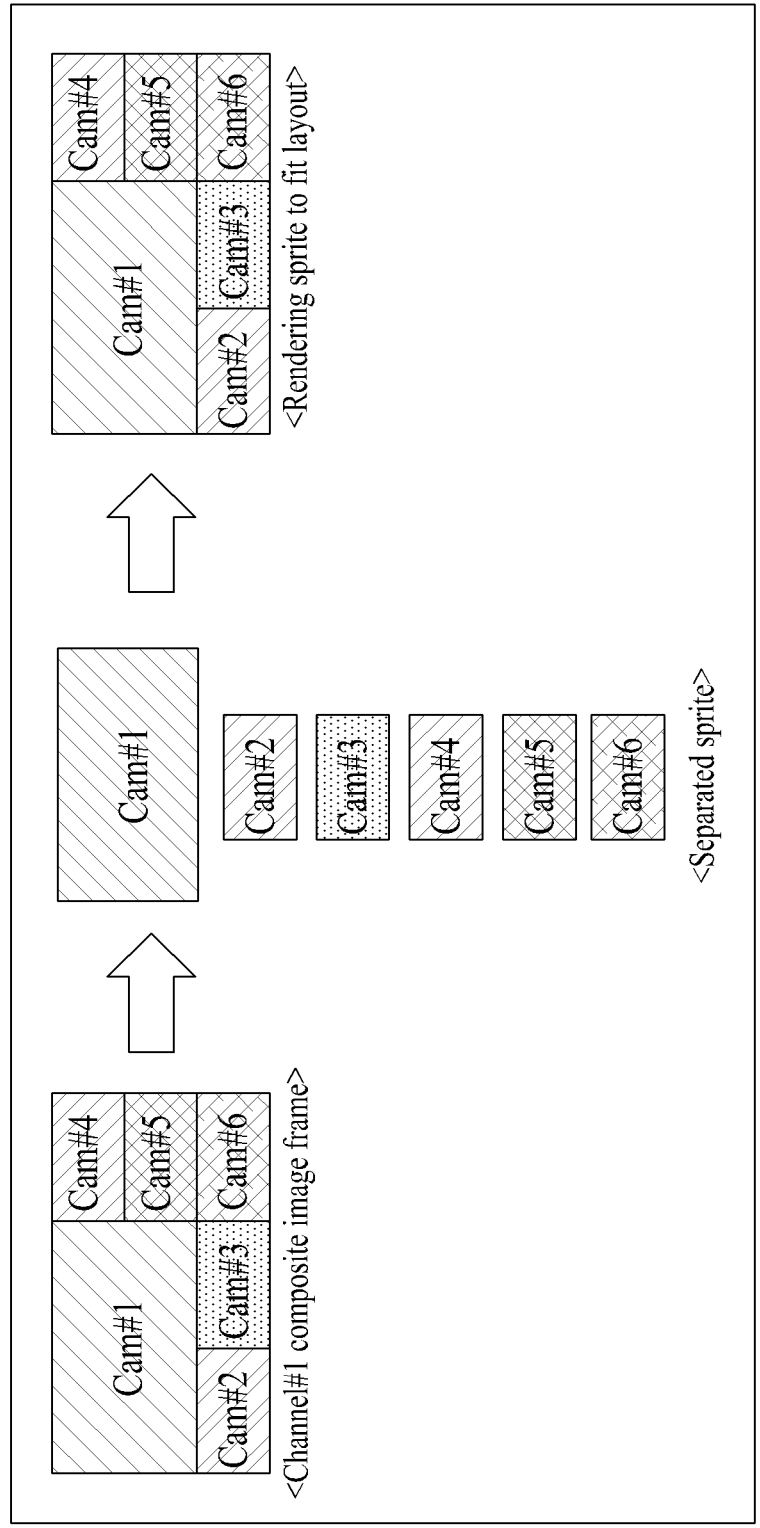
FIG. 7 illustrates an example of a basic process of composing a multi-view mode as a single stream according to an example embodiment.

FIG. 7 illustrates an example of a basic process of composing a multi-view mode as a single stream according to an example embodiment.

FIG. 7 illustrates a process of composing a multi-view mode using a Channel #1 composite image in the player 330. In the Channel #1 composite image, a video (Cam #1) of channel 1 is composed as a main image having a higher resolution than those of videos (Cam #2 to Cam #6) of other channels.

Referring to FIG. 7, the player 330 may compose a multi-view mode by receiving a Channel #1 composite image frame, by obtaining a sprite for each channel from the Channel #1 composite image frame through post processing, and then rendering the separated sprite for each channel according to a predetermined layout.

Therefore, the player 330 may compose a multi-view mode including live images of multiple channels by downloading only a single stream in a multi-stream live transmission environment.

Figure 8:
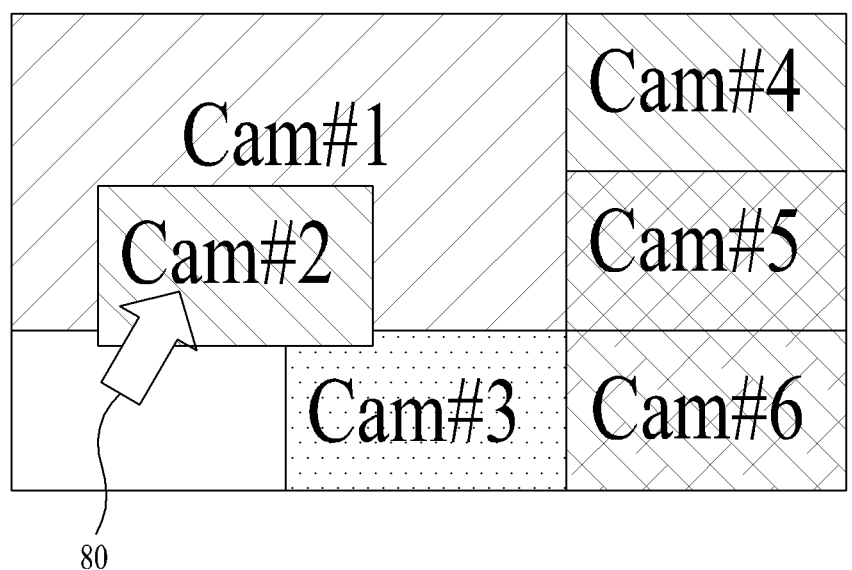
FIG. 8 illustrates an example of an interface for changing a player layout according to an example embodiment.

FIG. 8 illustrates an example of an interface for changing a player layout according to an example embodiment.

The player 330 provides an interface for requesting a change in a display position between videos (Cam #1 to Cam #6) of the respective channels in a multi-view mode or switching to a full-view mode for an image of a specific channel.

In a situation in which live images of multiple channels are being played back in a multi-view mode form on the player 330, the user may input a layout switching request for changing a display position between videos (Cam #1 to Cam #6) in the multi-view mode or switching one of the videos (Cam #1 to Cam #6) to the full-view mode.

For example, referring to FIG. 8, it is possible to change a display position between the video (Cam #1) of channel 1 and the video (Cam #2) of channel 2 by moving the video (Cam #2) of channel 2 to the position of a main image in which the video (Cam #1) of channel 1 is currently being played back through a drag 80 on a multi-view screen using a Channel #1 composite image. Alternatively, it is possible to request switching to a full-view mode through a predetermined menu or another gesture by selecting the video (Cam #2) of channel 2 from among the videos (Cam #1 to Cam #6) in the multi-view mode.

Also, it is possible to request switching from a full-view mode to a multi-view mode on the player 330.

Figure 9:
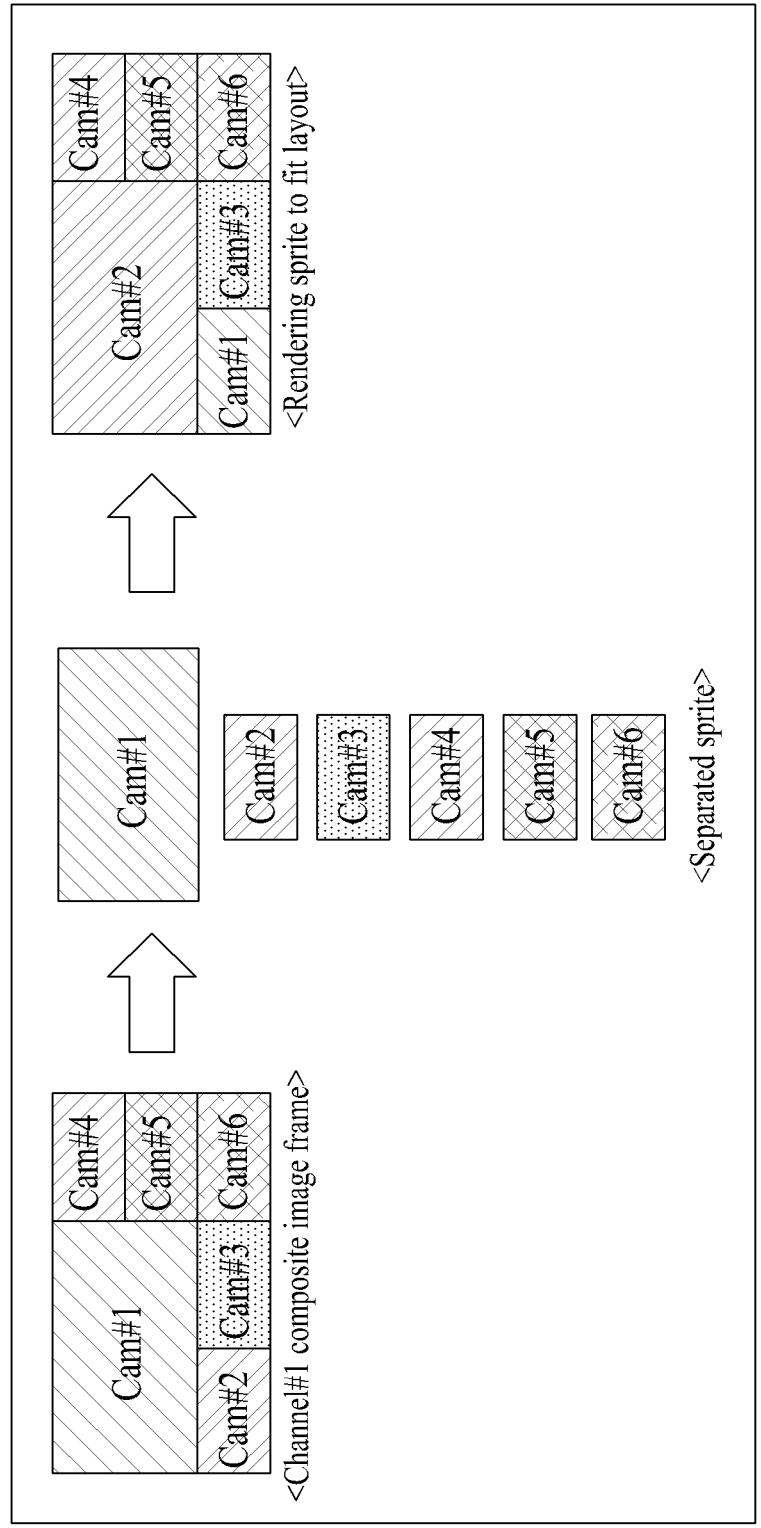
FIGS. 9 and 10 illustrate examples of a process of switching the layouts between multi-view modes according to an example embodiment.
Figure 10:
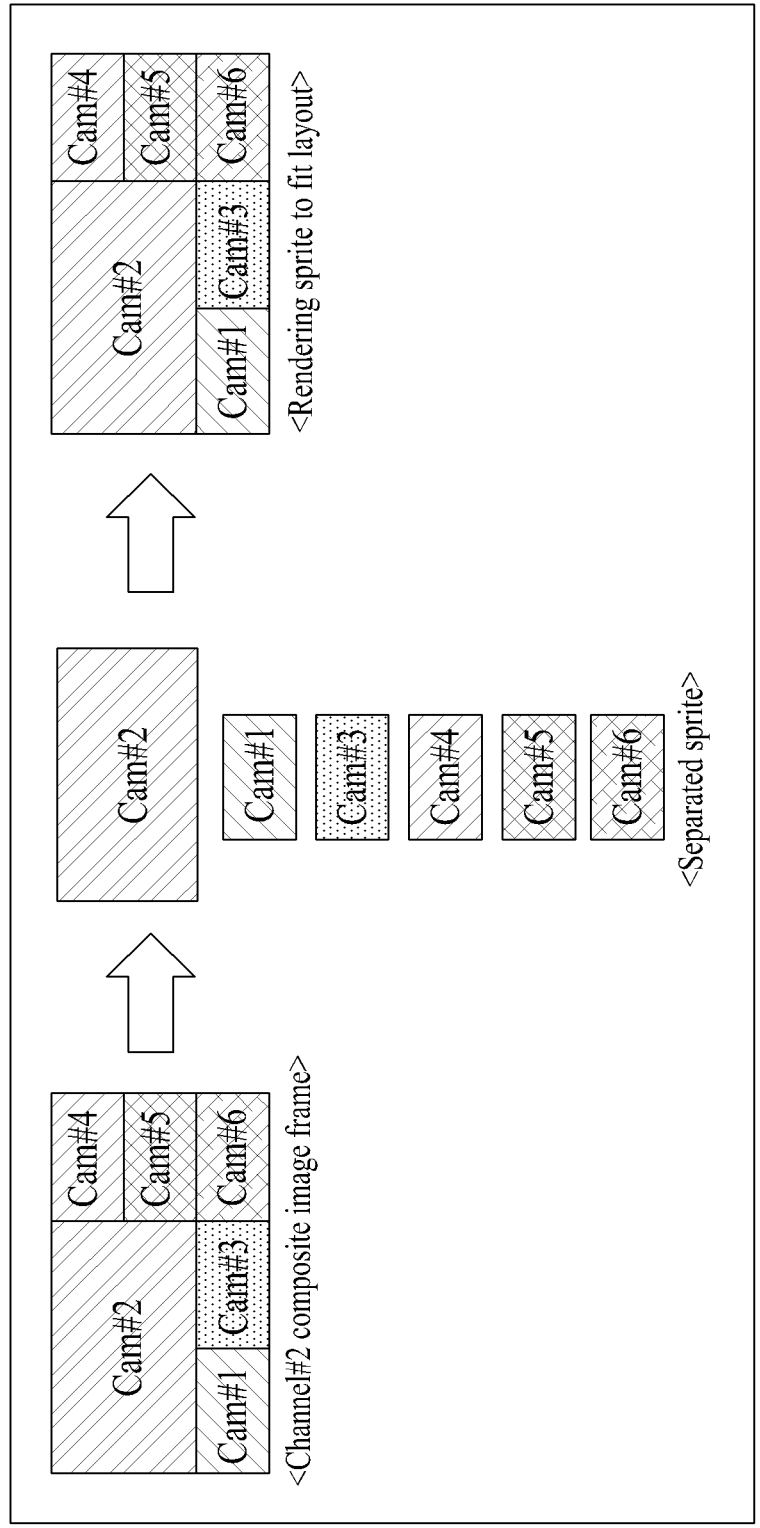

FIGS. 9 and 10 illustrate examples of a process of for switching layouts between multi-view modes according to an example embodiment.

FIGS. 9 and 10 illustrate examples of a process of switching from a multi-view mode using a Channel #1 composite image to a multi-view mode using a Channel #2 composite image.

When the user requests moving a video (Cam #2) of channel 2 to a main image position on a multi-view screen using the Channel #1 composite image, the player 330 may render a sprite for each channel separated from the Channel #1 composite image to fit a layout corresponding to the request as illustrated in FIG. 9, for seamless screen switching. The video (Cam #1) of channel 1 separated from the Channel #1 composite image may be downscaled to fit a layout changed into a high-quality image and the video (Cam #2) of channel 2 separated from the Channel #1 composite image may be upscaled in a low-quality state as a low-quality image and displayed at the main image position.

Next, referring to FIG. 10, to provide a high-quality image for the video (Cam #2) of channel 2, the player 330 may receive, from the encoder server 320, the Channel #2 composite image in which the video (Cam #2) of channel 2 is composed as a main image having a higher resolution than those of videos (Cam #1 and Cam #3 to Cam #6) of other channels. The player 330 may compose a multi-view mode using the Channel #2 composite image by receiving a Channel #2 composite image frame, by obtaining sprites for the respective channels through post processing, and by rendering the separated sprites for the respective channels to fit a corresponding layout. Here, the video (Cam #1) of channel 1 and the video (Cam #2) of channel 2 are sprites separated from the Channel #2 composite image. The video (Cam #1) of channel 1 may be changed to a low-quality image and the video (Cam #2) of channel 2 may be changed to a high-quality image.

Therefore, when the user requests moving the video of channel 2 to the main image position on the multi-view screen using the Channel #1 composite image, the player 330 may perform layout switching between multi-view modes by initially changing a layout using sprites for the respective channels separated from the Channel #1 composite image to prevent a screen disconnection and then receiving the Channel #2 composite image and rendering sprites for the respective channels separated from the Channel #2 composite image to fit the corresponding layout.

Figure 11:
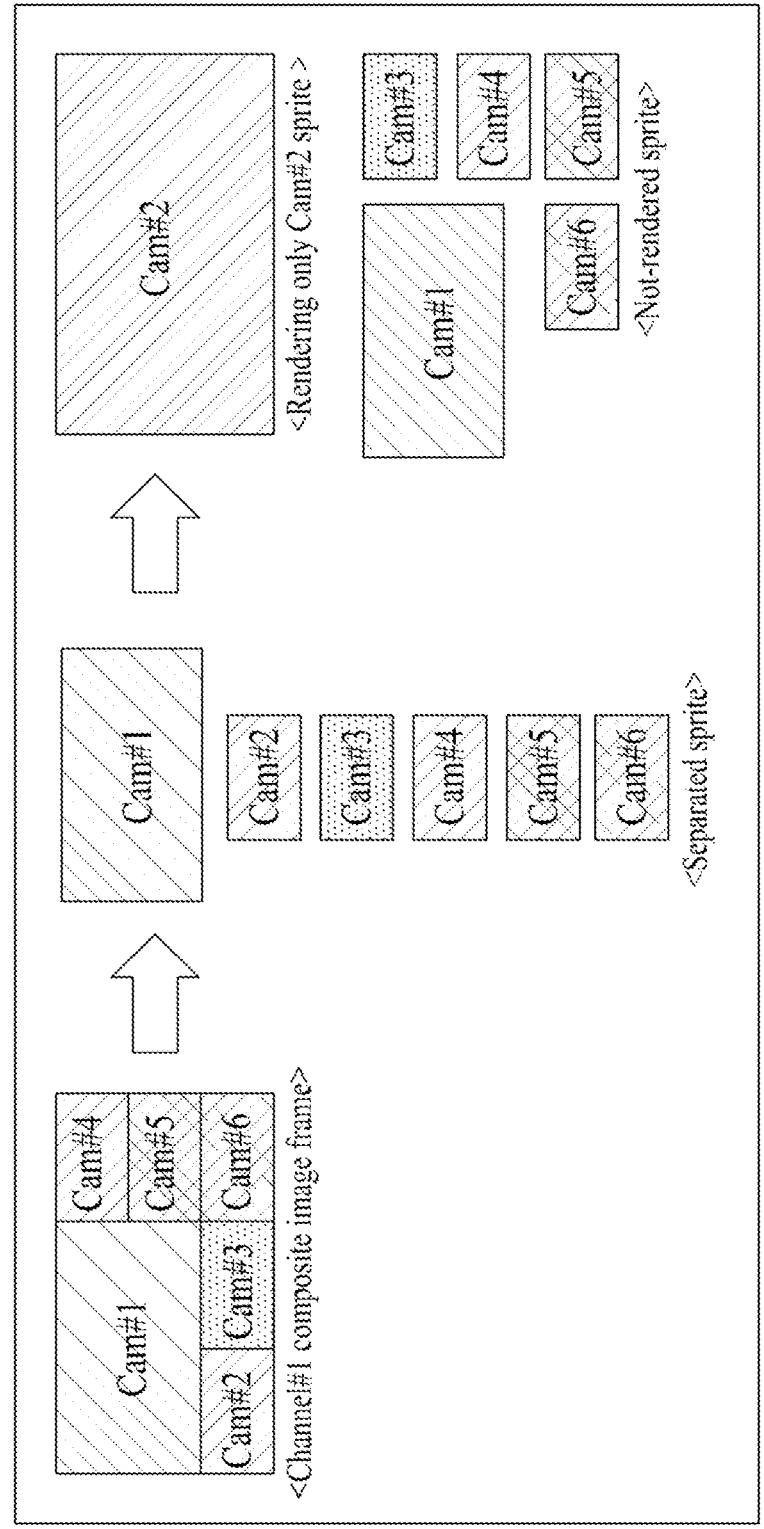
FIGS. 11 and 12 illustrate examples of a process of switching a layout from a multi-view mode to a full-view mode according to an example embodiment.
Figure 12:
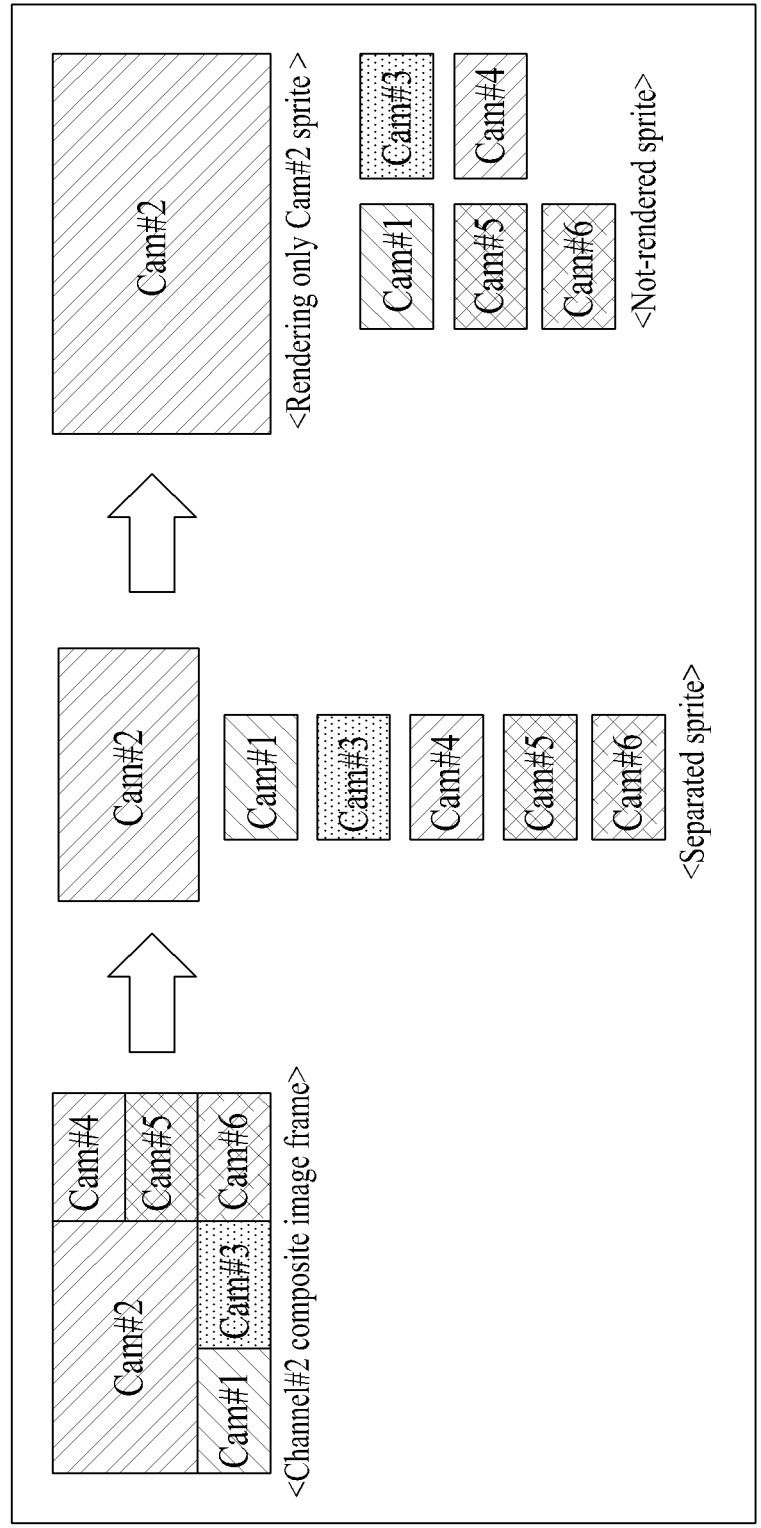

FIGS. 11 and 12 illustrate examples of a process of switching a layout from a multi-view mode to a full-view mode according to an example embodiment.

FIGS. 11 and 12 illustrate examples of a process of switching from a multi-view mode using a Channel #1 composite image to a full-view mode of a video (Cam #2) of channel 2.

When the user requests switching to a full-view mode for the video (Cam #2) of channel 2 on a multi-view screen using the Channel #1 composite image, the player 330 may render only a sprite corresponding to the video (Cam #2) of channel 2 among sprites for the respective channels separated from the Channel #1 composite image as illustrated in FIG. 11, for seamless screen switching. The video (Cam #2) of channel 2 separated from the Channel #1 composite image may be upscaled in a low-quality state as a low-quality image and displayed in a full-view mode. Here, videos (Cam #1 and Cam #3 to Cam #6) of other channels separated from the Channel #1 composite image are not rendered and maintained in a hidden state.

Next, referring to FIG. 12, to provide a high-quality image for the video (Cam #2) of channel 2 displayed in the full-view mode, the player 330 may receive the Channel #2 composite image from the encoder server 320. The player 330 may receive a Channel #2 composite image frame, may obtain sprites for the respective channels through post processing, and may render only a sprite corresponding to the video (Cam #2) of channel 2 among the separated sprites for the respective channels as a full screen. The video (Cam #2) of channel 2 separated from the Channel #2 composite image may be upscaled in a high-quality state as a high-quality image and displayed in the full-view mode. Here, the videos (Cam #1 and Cam #3 to Cam #6) of other channels separated from the Channel #2 composite image are not rendered and maintained in a hidden state Therefore, when the user requests switching the video of channel 2 to the full-view mode on the multi-view screen using the Channel #1 composite image, the player 330 may perform layout switching from the multi-view mode to the full-view mode by initially displaying the video (Cam #2) of channel 2 with a low resolution that is a sprite separated from the Channel #1 composite image and then receiving the Channel #2 composite image and displaying the video (Cam #2) of channel 2 with a high resolution that is a sprite separated from the Channel #2 composite image.

Figure 13:
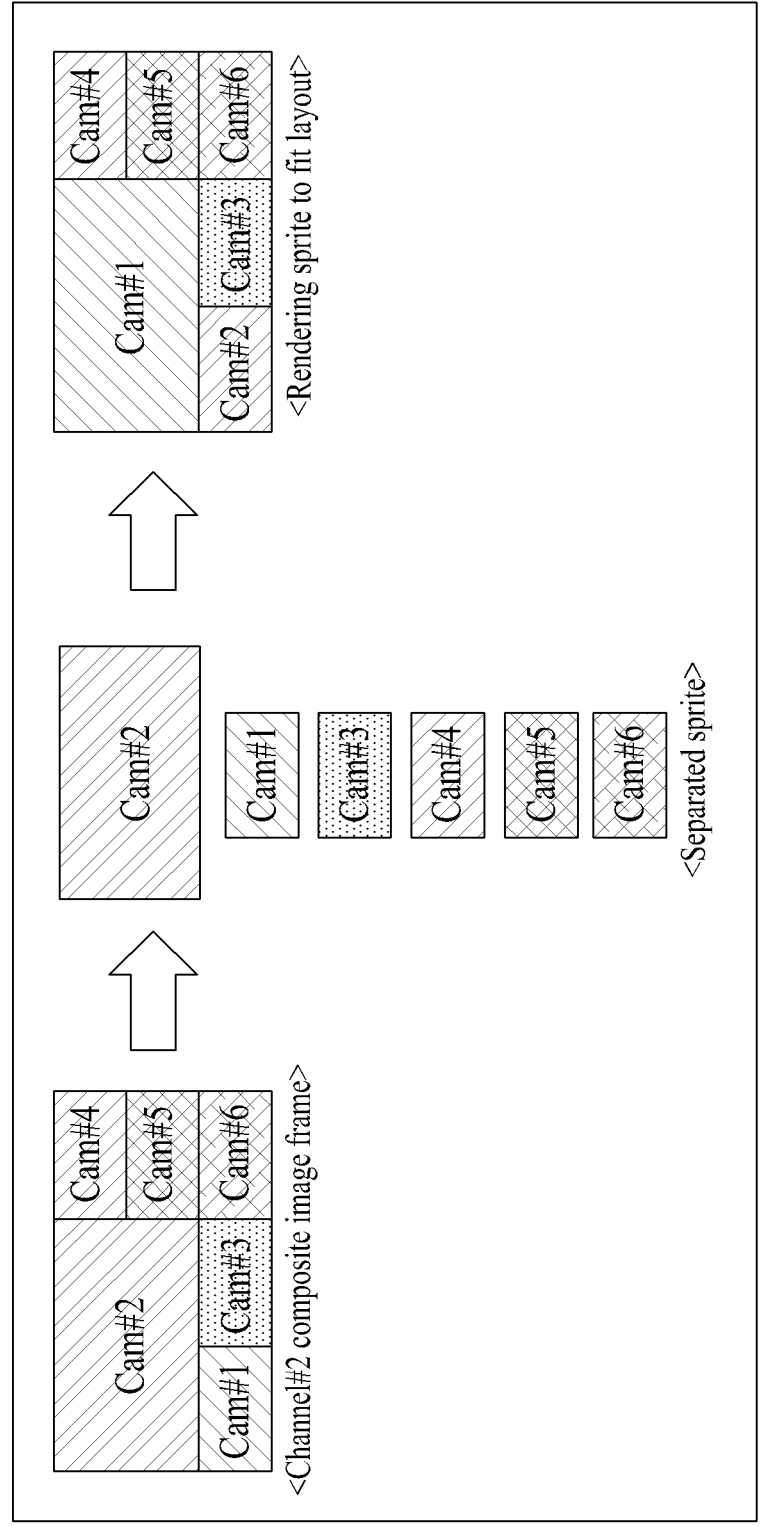
FIGS. 13 and 14 illustrate examples of a process of switching a layout from a full-view mode to a multi-view mode according to an example embodiment.
Figure 14:
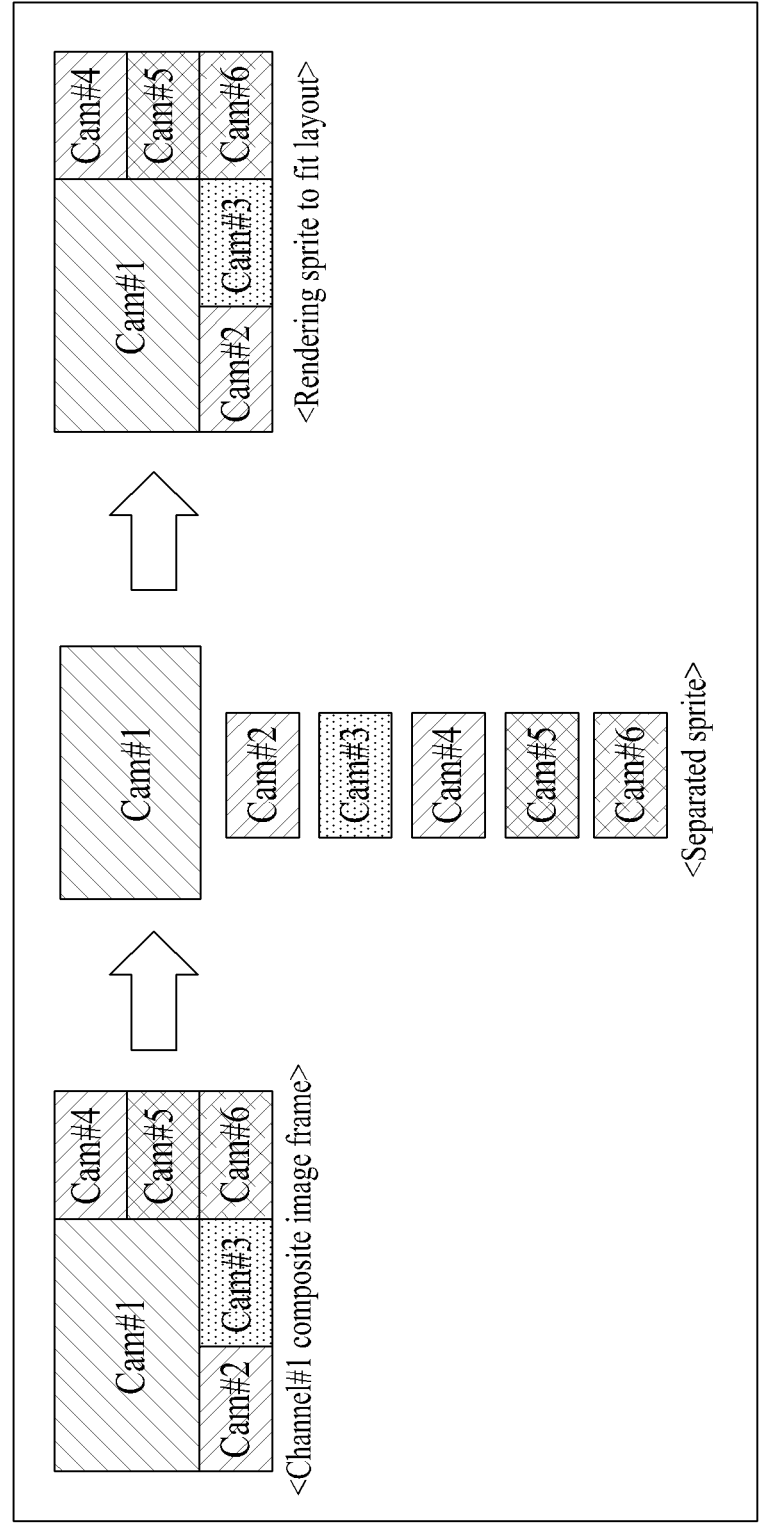

FIGS. 13 and 14 illustrate examples of a process of switching a layout from a full-view mode to a multi-view mode according to an example embodiment.

FIGS. 13 and 14 illustrate examples of a process of switching from a full-view mode of the video (Cam #2) of channel 2 to a multi-view using the Channel #1 composite image.

When the user requests switching from a full-view screen of a video (Cam #2) of channel 2 using a Channel #2 composite image to a multi-view mode of a default layout, for example, a multi-view mode using a Channel #1 composite image, the player 330 may initially render a sprite for each channel separated from the Channel #2 composite image to fit a layout corresponding to the request as illustrated in FIG. 13, for seamless screen switching. Although the video (Cam #2) of channel 2 is displayed in the full-view mode, videos (Cam #1 and Cam #3 to Cam #6) of other channels are included in a hidden state and thus, immediate switching to the multi-view mode may be performed. The video (Cam #1) of channel 1 and the video (Cam #2) of channel 2 in a current multi-view mode correspond to sprites separated from the Channel #2 composite image. The video (Cam #2) of channel 2 may be downscaled to fit a changed layout as a high-quality (high-resolution) image and the video (Cam #1) of channel 1 may be upscaled in a low-quality state as a low-quality (low-resolution) image and may be displayed at a main image position.

Next, referring to FIG. 14, to provide a high-quality image for the video (Cam #1) of channel 1, the player 330 may receive the Channel #1 composite image from the encoder server 320. The player 330 may compose a multi-view mode using the Channel #1 composite image by receiving a Channel #1 composite image frame, by obtaining sprites for the respective channels through post processing and then rendering the separated sprites for the respective channels to fit a corresponding layout. Here, the video (Cam #1) of channel 1 and the video (Cam #2) of channel 2 are sprites separated from the Channel #1 composite image, and the video (Cam #1) of channel 1 may be changed to a high-quality image and the video (Cam #2) of channel 2 may be changed to a low-quality image.

Therefore, when the user requests switching from the full-view screen of the video (Cam #2) of channel 2 using the Channel #2 composite image to the multi-view mode using the Channel #1 composite image, the player 330 may perform layout switching from the full-view mode to the multi-view mode by initially changing a layout using sprites for the respective channels separated from the Channel #2 composite image to prevent a screen disconnection and then receiving the Channel #1 composite image and rendering sprites for the respective channels separated from the Channel #1 composite image to fit the corresponding layout.

For layout switching between multi-view modes or for layout switching between a multi-view mode and a full-view mode, a composite image of a layout to switch to may be received using a track switching technology.

In a mode in which an audio and a video are interleaved, the player 330 may seamlessly play back the audio and may softly switch only the video although the audio and the video are interleaved when switching a composite image received from the encoder server 320 to a changed track.

In an environment in which a source modification or a buffer control of the player 330 is customizable, at least one of ultra-low-latency (ULL) technology and technology of flushing data in a buffer of the player 330 and receiving new data may be applied to minimize a delay occurring in layout switching. For example, for faster switching from a view mode using the Channel #1 composite image to a view mode using the Channel #2 composite image, the player 330 may apply a scheme of emptying previous data (a Channel #1 composite image stream) and filling new data (a Channel #2 composite image stream) in a buffer at a point in time at which a view mode switching request is received.

In an environment in which the player 330 is non-customizable, a request of the player 330 may be implemented by catching the request and making a re-request to a segment (TS file) of a switched track in a multi-view interceptor. The multi-view interceptor serves as a server and may be software modules installed and running on a terminal device of the user to play back a video with the player 330. When switching from the multi-view mode using the Channel #1 composite image to the full-view mode, the player 330 may continuously request the multi-view mode and, here, the multi-view interceptor may change the request of the player 330 to the full-view mode and may request the changed full-view mode. An audio of a TS file of each track may be encoded with the same audio to provide a seamless user experience when switching.

In general, when a stream of the same resolution is repeatedly output, a type of a corresponding stream may be unidentifiable. In a multi-view environment, a type of a stream that is currently being output needs to be known and, based on the known information, videos of the respective channels may be separated according to a corresponding layout.

The player 330 may determine an image switching point in time between view modes based on meta information for image identification as unique information included in an image stream. The meta information for image identification may be diversified according to a system environment. For example, in an environment using a TS chunk, the image switching point in time may be determined using timed-metadata included in a TS container. The timed-metadata includes time information of a predetermined time standard (PTS) and metadata is output when a corresponding time is reached.

Figure 15:
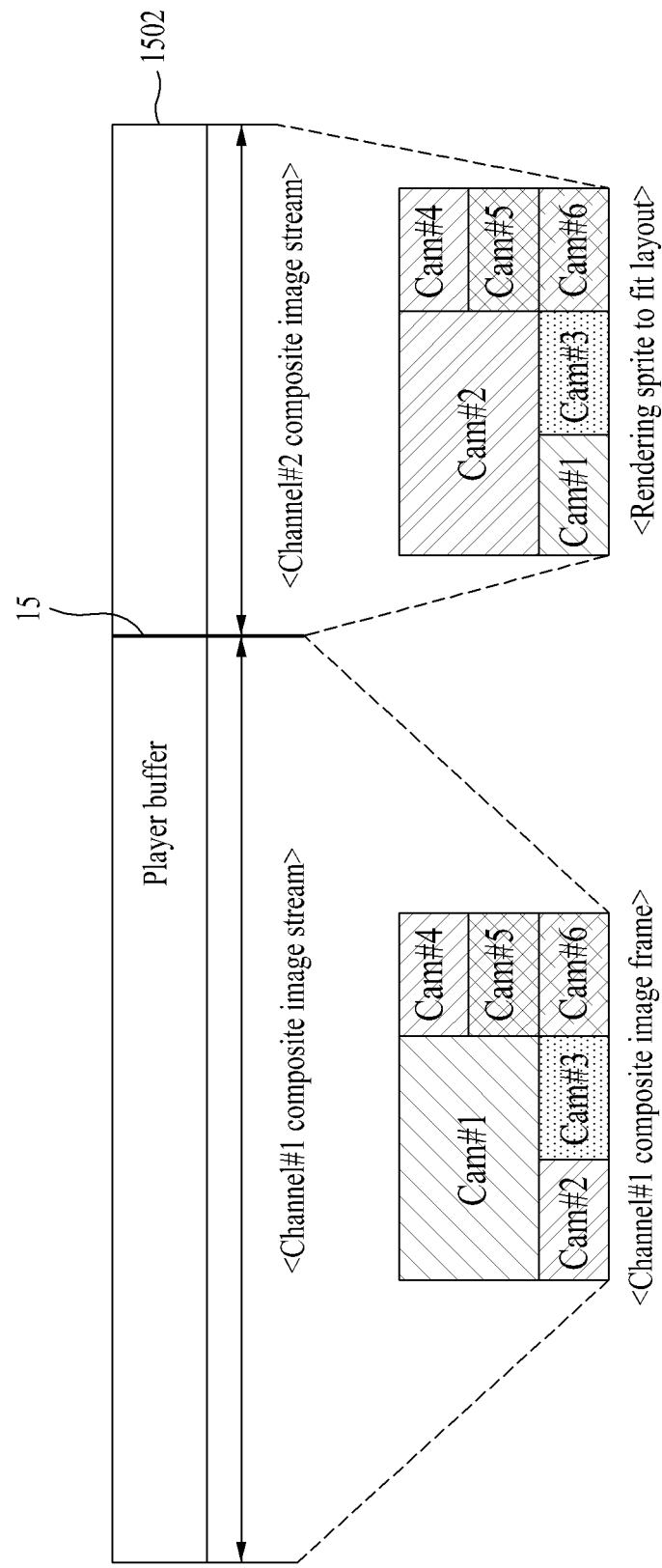
FIG. 15 illustrates an example of a process of determining an image switching point in time according to an example embodiment.

For example, referring to FIG. 15, the player 330 may identify a corresponding image based on metadata 15 included in a TS chunk of an image stream in a buffer 1502. That is, if a timed-metadata value is input at a point in time of switching from a Channel #1 composite image stream to a Channel #2 composite image stream, the player 330 may recognize a stream input after timed-metadata as a Channel #2 composite image and may separate and use an image of each channel.

In a system in a structure of providing a live video service through a session connection between a client and a server, an image switching point in time may be changed at a server end, however, a session base may have limitations in a number of users to which a service may be provide. Dissimilar thereto, the example embodiments may determine an image switching point in time on a client side using timed-metadata and, in particular, may provide a live streaming video service through an HTTP-based protocol rather than a session base. Therefore, the example embodiments may apply to an existing system environment and may provide a stable service to more users.

As described above, according to example embodiments, it is possible to play back live videos of multiple channels using a minimum number of networks by composing a multi-view mode by receiving a single stream in which live videos of multiple channels are synthesized into a single video in a multi-stream live transmission environment. In addition, according to example embodiments, it is possible to improve quality of service (QoS) and quality of experience (QoE) by implementing a seamless switching mode while maintaining synchronization between an audio and a video when switching between channels in a multi-stream live transmission environment.

The apparatuses described herein may be implemented using hardware components, software components, and/or a combination of the hardware components and the software components. For example, the apparatuses and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. A processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring a processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and runs in a distributed fashion. The software and data may be stored by one or more computer readable storage media.

The methods according to the above-described example embodiments may be configured in a form of program instructions performed through various computer devices and recorded in computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A live video playback method implemented by a computer apparatus having at least one processor configured to execute computer-readable instructions included in a memory, the method comprising:
    creating, by an encoder server, a plurality of composite images, wherein each of said composite images includes images of multiple channels that are synthesized into a single image in a live transmission environment;
    receiving, by the at least one processor, a first composite image from the plurality of composite images created by the encoder server;
    composing, by the at least one processor, a view mode having a layout including the images of the multiple channels using the first composite image; and
    changing, by the at least one processor, the layout of the view mode using the first composite image into another layout, and
    wherein, in the first composite image, an image of one channel is provided as a main image with a higher resolution than those of images of remaining other channels and the images of the other channels are provided as sub-images,
    wherein the changing includes selecting one of the sub-images and its associated channel and upscaling the sub-image that has been selected in a low quality state to display a low quality image of the sub-image that has been selected as part of the changed layout of the view mode, and
    wherein the composing of the view mode comprises, for the first composite image in which the main image has a higher resolution than the sub-images, rendering a sprite for each channel separated from the composite image according to a layout of a multi-view mode in which the image of a first channel is displayed as the main image,
    the changing of the layout comprises, when a sub-image of a specific channel is selected from the multi-view mode, rendering the sprite for each channel separated from the first composite image according to a layout of a multi-view mode in which the low quality image of the specific channel is displayed as the main image, and then receiving a second composite image in which the image of the specific channel has a higher resolution than images of remaining other channels and rendering a sprite for each channel separated from the second composite image according to the layout of the multi-view mode in which the image of the specific channel is displayed as the main image in place of the low quality image, and wherein upon the receipt of the second composite image, the low quality image is replaced with a higher resolution image.

2. The live video playback method of claim 1, wherein the changing of the layout comprises flushing an image stream corresponding to previous data in a player buffer for image switching between the view mode and another view mode.

3. The live video playback method of claim 1, wherein the changing of the layout comprises determining an image switching point in time between the view mode and another view mode using timed-metadata included in a container of an image stream.

4. The live video playback method of claim 1, wherein the changing of the layout comprises providing an interface for requesting a change in a display position between images of the respective channels in the view mode or switching from an image of a specific channel to a full-view mode.

5. The live video playback method of claim 2, wherein the player buffer that flushes the image steam corresponding to the previous data is the same player buffer that receives the image stream corresponding to new data.

6. A non-transitory computer-readable recording medium storing a program to computer-implement the live video playback method of claim 1.

7. A computer apparatus comprising:
    at least one processor configured to execute computer-readable instructions included in a memory, and
    an encoder server configured and arranged to receive real-time streaming from multiple channels and to create a plurality of composite images, wherein each of said composite images includes images of the multiple channels that are synthesized into a single image in a live transmission environment, wherein the at least one processor is configured to:
receive, as a single stream from the encoder server, a first composite image from the plurality of composite images created by the encoder server,
compose a view mode having a layout including the images of the multiple channels using the first composite image, and
change the layout of the view mode using the first composite image into another layout,
wherein, in the first composite image, an image of one channel is provided as a main image with a higher resolution than those of images of remaining other channels and the images of the other channels are provided as sub-images, and
wherein the changing includes selecting one of the sub-images and its associated channel and upscaling the sub-image that has been selected in a low quality state to display a low quality image of the sub-image that has been selected as part of the changed layout of the view mode, and
wherein the at least one processor is configured to, for the first composite image in which the main image has a higher resolution than the sub-images, render a sprite for each channel separated from the first composite image according to a layout of a multi-view mode in which the image of a first channel is displayed as the main image, and
when a sub-image of a specific channel is selected from the multi-view mode, render the sprite for each channel separated from the first composite image as a full screen and then receive a second composite image in which the image of the specific channel has a higher resolution than images of remaining other channels and render a sprite of the specific channel among sprites for the respective channels separated from the second composite image as the full screen in place of the low quality image, and wherein upon the receipt of the second composite image, the low quality image is replaced with a higher resolution image.

8. The computer apparatus of claim 7, wherein the at least one processor is configured to, in response to a user request for a full-view mode in which the sprite of the specific channel is rendered as the full screen, render the sprite for each channel separated from the second composite image according to a layout of a multi-view mode in which the image of the first channel is displayed as the main channel and then receive again the first composite image and render the sprite for each channel separated from the first composite image according to the layout of the multi-view mode in which the image of the first channel is displayed as the main image.

9. The computer apparatus of claim 7, wherein the sprite of the remaining other channels are not rendered and are included in a hidden state in a full-view mode in which the sprite of the specific channel is rendered as the full screen.

10. The computer apparatus of claim 7, wherein the at least one processor is configured to flush an image stream corresponding to previous data in a player buffer for image switching between the view mode and another view mode.

11. The computer apparatus of claim 10, wherein the player buffer that flushes the image steam corresponding to the previous data is the same player buffer that receives the image stream corresponding to new data.

12. The computer apparatus of claim 7, wherein the at least one processor is configured to determine an image switching point in time between the view mode and another view mode using timed-metadata included in a container of an image stream.

13. The computer apparatus of claim 7, wherein the at least one processor is configured to provide an interface for requesting a change in a display position between images of the respective channels in the view mode or switching from an image of a specific channel to a full-view mode.

14. A live video playback method implemented by a computer apparatus having at least one processor configured to execute computer-readable instructions included in a memory, the method comprising:
creating, by an encoder server, a plurality of composite images, wherein each of said composite images includes images of multiple channels that are synthesized into a single image in a live transmission environment, wherein the plurality of composite images includes: (i) a first composite image that includes a first main image, from a first channel, and a plurality of first sub-images, from channels other than the first channel, wherein the first sub-images are of lower resolution than the first main image, and (ii) a second composite image that includes a second main image, from a second channel, and a plurality of second sub-images, from channels other than the second channel, wherein the second sub-images are of lower resolution than the second main image, and further wherein the first channel is different from the second channel;
receiving, by the at least one processor, the first composite image;
composing, by the at least one processor, a view mode having a layout including the images of the multiple channels using the first composite image; and
changing, by the at least one processor, the layout of the view mode using the first composite image into a second layout including the images of the multiple channels using the second composite image,
wherein the changing of the layout comprises flushing an image stream corresponding to previous data in a player buffer for image switching between the view mode and another view mode during the changing the layout of the view mode, and
wherein the changing includes selecting one of the first sub-images and its associated channel and upscaling the selected first sub-image of the selected channel in a low quality state to display a low quality image of the selected first sub-image as part of the second layout, and
after displaying the low quality image, receiving, by the at least one processor, the second composite image, and wherein the selected image of the selected channel is provided as a new main image with a higher resolution than those images of the remaining other channels, which are provided as new sub-images, and replacing the low quality image of the selected channel with a high quality image of the new main image from the second composite image.

15. The live video playback method of claim 14, wherein the at least one processor is configured to flush an image stream corresponding to the first composite image in a player buffer for image switching between the view mode and another view mode and to receive the image stream corresponding to the second composite image in the same player buffer.

* * * * *